G. W. RICHARDSON.
Grain Drill.

No. 23,812.

Patented Apr. 26, 1859.

Witnesses:
J. J. Orange
James Diddle

Inventor:
George W. Richardson.

UNITED STATES PATENT OFFICE.

GEORGE W. RICHARDSON, OF GRAYVILLE, ASSIGNOR TO HIMSELF AND JOHN P. WILLIAMS, OF WHITE COUNTY, ILLINOIS.

IMPROVEMENT IN SEEDING-MACHINES.

Specification forming part of Letters Patent No. 23,812, dated April 26, 1859.

*To all whom it may concern:*

Be it known that I, GEORGE W. RICHARDSON, of Grayville, in the county of White and State of Illinois, have invented a new and useful Improvement in Harrows and Seed-Sowers; and I do hereby that the following is a full, clear, and exact description of the construction and operation of the same, reference being had to the annexed drawings, making a part of this specification, in which—

Figure 1:
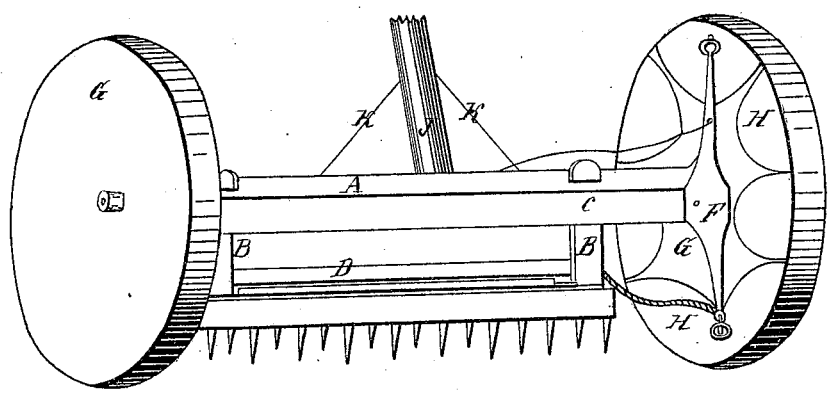
Figure 2:
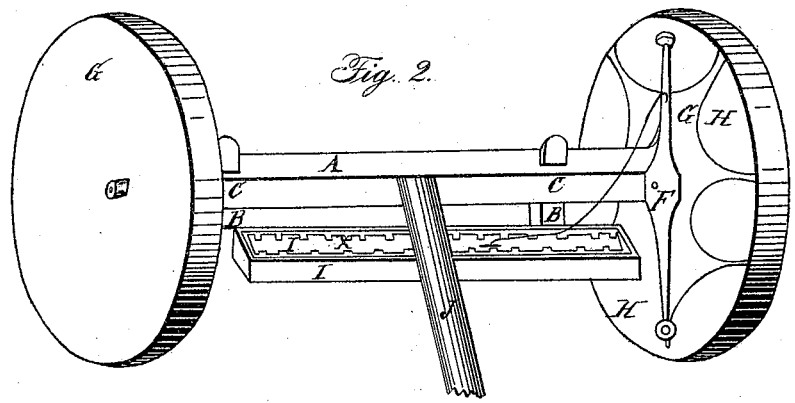

Figure 1 is a back view, and Fig. 2 is a front view with seed-sower attached.

A is the axle-tree.

B B is a part of the harrow-frame that passes through the mortises C C in the axle-tree A.

D D are stationary bars, framed to the uprights B B, with a space sufficient between them to admit of another bar, E, which is caused to vibrate by means of reciprocating lever F, which is also attached to axle-tree A by means of a bolt passing through the center of lever F.

G G are ordinary wagon or cart wheels, one of which is supplied with a cam-flange, H, which gives a vibratory motion to lever F as the machine is drawn along the ground.

I is a seed-sower that is attached to the draft-pole J, just in front of the harrow D D, containing a notch-slide, X. The seed-slide X receives its vibratory motion from lever F.

K K are stays or braces attached to D D at one end and to the draft-pole at the other, which allows that part of the harrow-frame that passes through the mortises C C to play freely up and down, so as to suit the unevenness of the ground. The bars D D and E are supplied with as many teeth as necessary.

Now, as the machine is drawn along the ground the clods pass between the teeth of the front bar and come in contact with the teeth of the bar E, which pulverize them completely.

What I claim as my invention, and desire to secure by Letters Patent, is—

The arrangement of the cam-wheel H and lever F with the seed-slide X and vibratory bar E of the harrow D D, when the whole are constructed for operation conjointly in the manner and for the purpose herein set forth.

GEORGE W. RICHARDSON.

Witnesses:
S. I. ORANGE,
JAMES DIDDLE.